June 4, 1968   W. E. THILL   3,386,154
OIL SEA ASSEMBLY SLEEVE
Filed April 29, 1966

INVENTOR.
Walter E. Thill
BY
Marney, Dickey & Pierce
ATTORNEYS.

United States Patent Office 3,386,154
Patented June 4, 1968

3,386,154
OIL SEAL ASSEMBLY SLEEVE
Walter Edward Thill, Bloomfield Township, Oakland County, Mich., assignor to Federal-Mogul Corporation, Southfield, Mich., a corporation of Michigan
Filed Apr. 29, 1966, Ser. No. 546,414
14 Claims. (Cl. 29—271)

ABSTRACT OF THE DISCLOSURE

A tubular device for applying radial seals on a seal receiving surface on a spindle. One end of the tubular member has a surface for supporting a seal while the same is being moved into position on the seal receiving surface of the spindle. The other end of the tubular member has a surface against which an advancing means engages to position said seal.

---

The present invention relates to apparatus for applying radial seals.

An annular oil seal must be properly seated upon an annular surface and/or located in a cavity to provide an effective seal between the surfaces to be sealed. The assembly of a seal must be done carefully and normally can require a substantial time. Therefore, it is an object of the present invention to provide apparatus whereby an annular seal can be properly and quickly assembled.

There are many different sized shafts and/or cavities to which seals of different sizes are to be applied. It is desirable to have a single piece of apparatus which can be readily adapted to apply any one of a number of seals to different shafts. Therefore, it is another object of the present invention to provide apparatus which is readily adaptable for applying seals of different sizes onto different shafts.

It is a general object of the present invention to provide a novel apparatus for assembling seals.

Other object, features, and advantages of the present invention will become apparent from the subsequent description and the appended claims, taken in conjunction with the accompanying drawings, in which:

Figure 1:
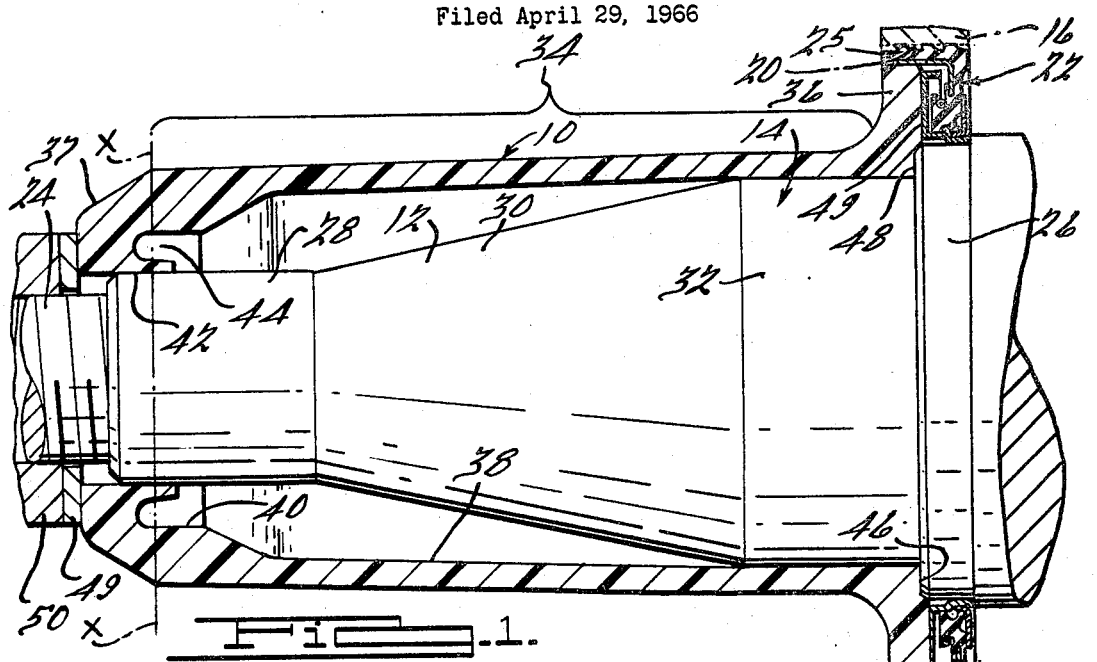
FIGURE 1 is a view showing the seal assembly device in longitudinal section and depicting the assembly of a seal onto an axle shaft, only partially shown.

Looking now to FIGURE 1, an oil seal assembly device or sleeve is shown in axial or longitudinal cross section and generally is indicated by the numeral 10, and is shown to be in assembly relationship with the spindle portion 12 of an axle shaft 14. The spindle portion 12 is adapted to support a wheel, a portion of which is shown in phantom and generally indicated by the numeral 16. The wheel portion 16 has a bore 20 through which the axle shaft 14 extends. The annular seal member to be applied by the sleeve 10 is generally indicated by the numeral 22.

The spindle portion 12 is generally of a stepped construction having a reduced diameter threaded portion 24 at its outer end progressing to an enlarged diameter annular seat portion 26.

The axle 14 has a straight annular portion 28 located between the reduced diameter threaded portion 24 and a tapered portion 30 which tapers to a larger diameter portion 32 which is located adjacent the seal receiving portion 26.

The sleeve 10 is generally tubular in shape and has a generally straight tubular portion 34 which is connected at its inner end to an enlarged diameter flange portion 36. The sleeve 10 terminates at its outer or forward end in a generally frusto conically shaped portion 37. Internally, the sleeve 10 is provided with a generally uniform diameter bore portion 38 extending from its inner or flanged end into a reduced diameter bore portion 40. The reduced diameter bore portion 40 is located near the outer end of the sleeve portion 34 and is in turn connected to a further reduced diameter bore portion 42 at the extreme outer end of the sleeve 10. The inner end of the reduced diameter portion 42 extends generally concentrically with a portion of the reduced diameter portion 40 and is separated therefrom by an annular groove 44, which serves a purpose presently to be described.

At the flanged end of the sleeve 10, a counterbore 46 is provided which is of a shape mating with the shape of the axially outer end of the shoulder 48 defined by the juncture between the portion 32 and the seal seating portion 26.

The flange 36 is of a diameter to accept a lip portion 25 of the seal assembly 22 and engage the outer face 49 of the seal. The sleeve 10 is used with the wheel removed from the spindle portion 12 and in applying the seal onto the seal receiving portion 26 the seal is first located upon the flange 36. Next, the sleeve 10 with the seal 22 thereon is piloted over the spindle portion 12 of the axle shaft 14. Note that the diameter of the enlarged portion 32 is generally equal to the internal diameter of the bore portion 38 and, hence, the inner end of the sleeve 10 will be piloted thereon.

Also the forward outer bore portion 42 of the sleeve 10 is of a diameter substantially equal to the portion 28 and, hence, the outer end of the sleeve 10 will be piloted thereon. With the sleeve 10 thus accurately piloted upon the spindle portion 12 the seal assembly 22 can then be guided accurately and located upon the seal seating annular portion 26. The total length of the sleeve 10 is provided such that its outer end 37 terminates proximate the threaded portion 24. Thus, by assembling a washer 49 and nut 50 over the threaded portion 24 and into engagement with the outer end of the sleeve 10 and by tightening the nut 50, the sleeve 10 will be moved axially relative to the spindle portion 12 of the axle shaft 14 until the locating counterbore 46 engages the shoulder 48 at which time the seal 22 is properly located upon the seal receiving annular portion 26. The sleeve 10 can be removed by removing the nut 50 and the washer 49. With the above apparatus the proper and rapid assembly of the seal is insured.

There are many different sizes of axle shafts and seal sizes. The seal assembly sleeve 10 as shown in FIGURE 1 is of a construction which, by only slight modification, can be used for different axle shafts and seals.

Figure 2:
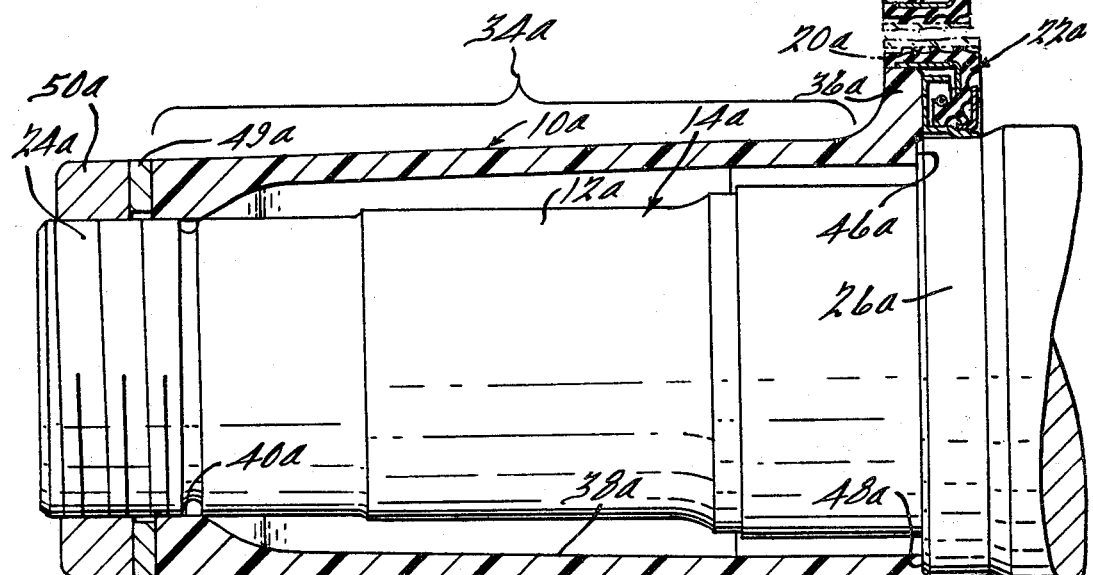
FIGURE 2 is a view similar to that of FIGURE 1 depicting a modified form of the seal assembly device for use in applying a seal to a different sized shaft.

Looking now to FIGURE 2, the seal assembly sleeve 10 is shown in its modified form for use with a different axle. In the description of the embodiment of FIGURE 2, components similar to like components of FIGURE 1 are given the same numerical designation with the addition of the letter subscript a.

Looking now to FIGURE 2, the sleeve 10a is constructed from the basic sleeve 10 of FIGURE 1 and has the flange portion 36a located at its inner end. The flange 36a is of a diameter to accommodate the seal 22a which is to be mounted upon an annular seal receiving portion 26a of a spindle portion 12a of an axle shaft 14a. Since the flange portion 36a is smaller than flange portion 36, the sleeve 10 can be readily modified to have flanged portion 36a. The counterbore 46a is provided to act as a locating and guiding surface relative to a portion of a shoulder 48a. While the generally uniform internal diameter 38a, of the sleeve 10a, is of a size to be in clearance relationship with the spindle portion 12a of the axle shaft 14a. The reduced diameter, bore portion 40a, is of a diameter to pilot upon the outer or threaded end 24a of the spindle 12a. Note that the outer end of the spindle 12a is generally of a large diameter relative to the outer end of the spindle 12. Note also that the spindle 12a is generally of a shorter axial length than the spindle 12. To accommodate the spindle 12a, the outer end portion 37 of sleeve 10 is generally cut along the line X—X of FIGURE 1 resulting in a forward end construction as shown in FIGURE 2. It can be seen that the annular groove 44 assures removal of the outer end 36 including the entire piloting, bore portion 42 when the outer end is diametrically cut along the line X—X. With the construction of FIGURE 2, by means of a washer 49a and nut 50a threaded upon the threaded portion 24a, the sleeve 10a can be moved axially along spindle 10a to locate the seal 22a upon the seal receiving annular portion 26a. The counterbore 46a acts as a locating surface relative to the shoulder 48a and terminates axial movement of the sleeve 10a and, hence, of the seal 22a.

Figure 3:
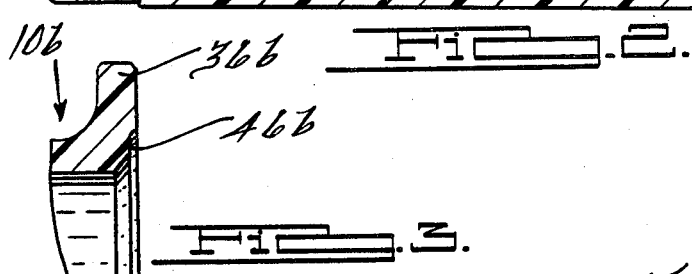
FIGURE 3 is a fragmentary sectional view showing a portion of a still further modified seal assembly device.

Looking now to FIGURE 3, a still different form of sleeve 10b is shown and has a different structure at the flanged end. The sleeve 10b has a flanged portion 36b with a counterbore 46b having a modified contour for use with a spindle portion having a shoulder which differs from the shoulders 48 and 48a.

It is contemplated that a sleeve be molded of plastic, metal or other suitable material to the shape of one sleeve, e.g., sleeve 10, and that from this basic shape a plurality of different sleeves can be constructed. With this construction only one mold need be provided for a number of different sleeves.

Thus it can be seen that the sleeve 10 can effectively serve as a seal assembly apparatus for one axle shaft and by means of simple modifications can be readily utilized as a device for assembling seals for axle shafts of different sizes and shapes.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. Apparatus for applying an annular seal onto an annular seal receiving surface on a spindle which extends outwardly from and terminates at a selected distance beyond the seal receiving surface, said apparatus comprising: a generally tubular member, support means at the inner end of said member for supporting the seal, guide and locating means on said tubular member engageable with the spindle for guiding said tubular member over the spindle and locating the seal onto the seal receiving surface, said guide and locating means including a radially inwardly facing surface engageable with the spindle for guiding said tubular member and a different surface engageable with a selected surface on the spindle for axially positioning the seal at a selected location.

2. The apparatus of claim 1 in which the spindle has a threaded portion and the outer end of said member terminates at the threaded portion whereby said member can be moved axially by manipulation of a nut on the threaded portion.

3. The apparatus of claim 1 with said support means comprising an enlarged diameter flange.

4. The apparatus of claim 1 with said guide and locating means comprising a counterbore surface contoured to matably engage the radially and axially outer end of the seal receiving surface.

5. The apparatus of claim 1 with said guide and locating means comprising an annular radially inner guide surface at said inner end being of a diameter substantially equal to the diameter of a portion of the spindle and located to pilot upon that portion of the spindle.

6. The apparatus of claim 1 with said guide and locating means comprising an annular radially inner guide surface at the outer end of said member with said guide surface being of a diameter substantially equal to the diameter of a portion of the spindle and located to pilot upon that portion of the spindle.

7. The apparatus of claim 1 with said guide and locating means comprising a separate guide means located at one end of said member for a different spindle and with said separate guide means being operable upon removal of a portion of said member at said one end.

8. The apparatus of claim 7 with said one end being the outer end of said member.

9. The apparatus of claim 1 with said guide and locating means comprising an annular radially inner first guide surface at the outer end of said member with said first guide surface being of a diameter substantially equal to the diameter of a portion of the spindle and located to pilot upon that portion of the spindle and further comprising a radially inner alternate guide surface being radially outwardly and at least partially axially inwardly separated from asid first guide surface and being operable with said member being axially reduced in length with said first guide surface removed to guide said member over a different spindle by piloting upon a portion having a diameter substantially equal to the diameter of said alternate guide surface.

10. The apparatus of claim 9 with said first and said alternate guide surfaces partially axially overlapping and being separated at their overlapped portions by a groove whereby said first guide surface can be removed by removing said outer end of said member along a diametrical plane through said groove.

11. The apparatus of claim 10 with said guide and locating means comprising a counterbore surface contoured to matably engage the radially and axially outer end of the seal receiving surface associated with the spindle for which said member is to be used.

12. The apparatus of claim 11 with said guide and locating means comprising an annular radially inner guide surface at said inner end being of a diameter substantially equal to the diameter of a portion of the spindle and located to pilot upon that portion of the spindle.

13. The apparatus of claim 12 with said support means comprising an enlarged diameter flange.

14. The apparatus of claim 13 in which the spindle has a threaded portion and the outer end of said member terminates at the threaded portion whereby said member can be moved axially by manipulation of a nut on the threaded portion.

References Cited

UNITED STATES PATENTS

| 974,583 | 11/1910 | Meier et al. | 81—8.1 |
| 3,123,902 | 3/1964 | Isenbarger | 29—271 |
| 3,289,502 | 12/1966 | Jessen | 81—8.1 |

FOREIGN PATENTS

| 73,045 | 2/1948 | Norway. |
| 683,413 | 3/1930 | France. |

OTHELL M. SIMPSON, *Primary Examiner.*